United States Patent [19]

Hodge

[11] Patent Number: 4,694,667
[45] Date of Patent: Sep. 22, 1987

[54] PERMANENT PADLOCK-CHAIN ASSEMBLY

[76] Inventor: Allan M. Hodge, 5852 Lomond Dr., San Diego, Calif. 92120

[21] Appl. No.: 759,408

[22] Filed: Jul. 26, 1985

[51] Int. Cl.⁴ .................. E05B 67/06; A43C 11/08; A44B 13/00; F16G 15/00
[52] U.S. Cl. .................. 70/49; 24/232 R; 24/116 R; 411/311
[58] Field of Search .................. 70/46–49, 70/57, 52, 58; 24/232 R, 116 R; 403/79; 411/911

[56] References Cited

U.S. PATENT DOCUMENTS

| | | | |
|---|---|---|---|
| Re. 29,643 | 5/1978 | Berry et al. | 70/52 |
| 285,962 | 10/1883 | Bracken | 24/232 R |
| 646,813 | 4/1900 | Edholm | 24/232 R |
| 952,958 | 3/1910 | Straughan | 24/232 R |
| 1,550,454 | 8/1925 | Provost | 24/232 R |
| 1,842,741 | 1/1932 | Bengtsson | 411/911 |
| 1,845,354 | 2/1932 | Soref | 70/49 |
| 2,963,895 | 12/1960 | Thomas | 70/57 |
| 3,161,450 | 12/1964 | Goodenough | 411/911 |
| 3,590,608 | 7/1971 | Smyth | 70/49 |
| 3,599,298 | 8/1971 | Anderson | 24/232 R |
| 3,625,031 | 12/1971 | Alley | 70/58 |
| 3,636,739 | 1/1972 | Smedley | 70/49 |
| 3,652,114 | 3/1972 | Cady et al. | 70/52 |
| 3,662,320 | 5/1972 | Marx | 70/57 |
| 3,765,197 | 10/1973 | Foote | 70/49 |

*Primary Examiner*—Gary L. Smith
*Assistant Examiner*—Vinh Luong
*Attorney, Agent, or Firm*—Poms, Smith, Lande & Rose

[57] ABSTRACT

In order to avoid separation of a padlock and chain which are utilized together, an assembly including a pair of brackets is employed. The brackets are each formed of bent sheet metal stock with upstanding ears and outwardly extending arms which over-lie one another. The two arms have opposed notches for receiving and holding a link of the chain when the brackets are secured together by a one-way screw extending through the overlapping portions of the brackets, between the bracket ears. The bracket ears have spaced, aligned holes for receiving the pivot shank of the shackle of a padlock.

8 Claims, 5 Drawing Figures

PERMANENT PADLOCK-CHAIN ASSEMBLY

FIELD OF THE INVENTION

The present invention relates to chain and padlock assemblies.

BACKGROUND OF THE INVENTION

When chain and padlock sets are employed for locking purposes, they frequently become separated while they are unlocked, either accidentally, or because the padlock or chain is preempted for other uses. However, whether intentional or accidental, the separation of the chain and padlock precludes the intended use of the combination, and results in inconvenience and expense.

Accordingly, a principal object of the present invention is to prevent the separation of padlock and chain assemblies.

SUMMARY OF THE INVENTION

In accordance with a preferred illustrative embodiment of the invention, an assembly for avoiding the separation of a padlock and chain includes a pair of brackets, each having an upstanding ear and an outwardly extending arm; with the two arms overlying one-another, and having opposed notches for receiving a link of a chain. The ears of the brackets have holes which are spaced apart and aligned for closely engaging the pivot shank portion of the shackle of the padlock. In practice, with the padlock open, the two ears of the bracket are slipped over onto the pivot shank of the padlock shackle, one end link of the chain is located in the two opposed notches in the bracket arm; and the two bracket arms are then secured together in overlapping relationship so that the chain is held to the bracket in the two notches, and the spaced-apart openings of the bracket assembly cannot slide over the curved portion of the padlock shackle, and the bracket assembly is therefore secured to the padlock even when the padlock is unlocked.

In accordance with a collateral aspect of the invention, a one-way locking screw with a special head is employed to secure the two brackets together in the overlapping area between the two upstanding ears of the brackets so that removal of the screw is severely inhibited. Also, to provide increased engagement for the locking screw, the lower bracket may be formed around the threaded lower hole, to provide an extended ridge around the hole, thereby increasing the threaded engagement of the locking screw.

In accordance with a broader aspect of the invention, a padlock may be provided with a bracket having (1) an outwardly extending member including arrangements for securing to a chain link; and (2) a pair of spaced aligned holes, mounted on the pivot shaft of the shackle of a padlock; to prevent separation of the chain from the padlock.

Other objects, features, and advantages of the invention will become apparent from a consideration of the following detailed description and from the accompanying drawings.

DETAILED DESCRIPTION

Figure 1:
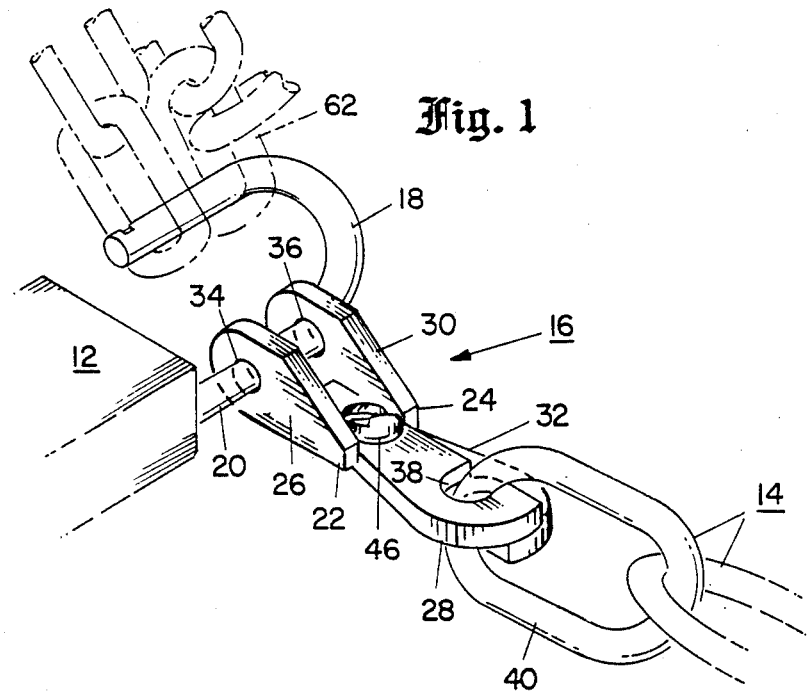
FIG. 1 is an assembly drawing illustrating the principles of the invention, and showing a padlock, a chain, and a bracket assembly for holding the padlock and chain together.
Figure 2:
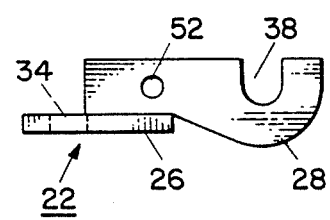
FIGS. 2 and 3 are top and side views, respectively, of one of the two brackets, of the bracket assembly of FIG. 1.

Referring more particularly to the drawings, FIG. 1 shows a padlock 12 to which a chain 14 is secured by a bracket assembly 16. The padlock 12 has a securing shackle or loop 18 with a pivot shank 20 to which the bracket assembly 16 is secured.

The bracket assembly 16 is formed of two bent or formed sheet metal members 22 and 24, with bracket 22 having an upstanding ear portion 26 and an outwardly extending arm portion 28; while bracket member 24 has corresponding parts 30 and 32, respectively.

The ears 26 and 30 have spaced aligned holes 34 and 36, respectively, formed with a fairly close tolerance fit over the pivot shank or shaft 20 of the padlock 12 so that, following locking together of the two bracket members 22 and 24, the bracket assembly 16 may not be slid over the curved portion of the padlock loop or shackle 18.

Figure 4:
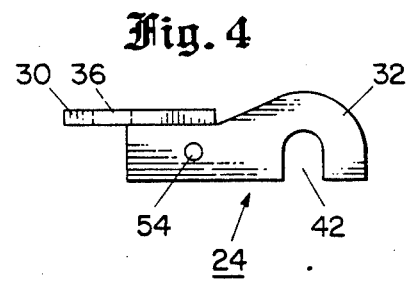
FIGS. 4 and 5 are top and side views, respectively of the other of the two brackets of FIG. 1.
Figure 3:
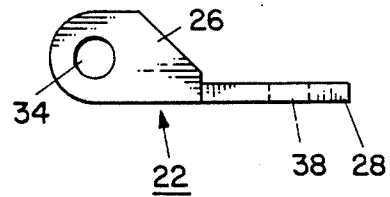
Figure 5:
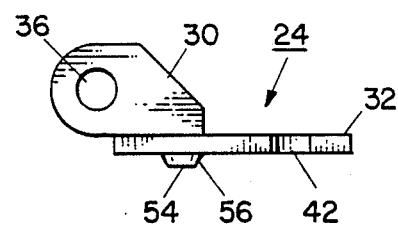

The outwardly extending arm 28 of bracket 22 is provided with a notch 38 for engaging a link 40 of the chain 14. The outwardly extending arm 32 of the lower bracket 24 has an opposed notch 42, as best seen in FIGS. 4 and 5, so that, when the two brackets are secured together, the link 40 of claim 8 is secured to the bracket assembly 16 by the opening formed by the two opposed notches 38 and 42.

The one-way screw 46 holds the two brackets 22 and 24 together to form the bracket assembly 16. The screw 46 is provided with a special driving configuration, known per se, which permits fastening the screw in place with clockwise rotation of a conventional screwdriver, but includes a ramp-type geometry which provides no engagement for a screwdriver if an effort is made to loosen the screw. The screw 46 is also located between the ears 26 and 30 to protect against the use of a pair of pliers or the like to loosen screw 46. The brackets 22 and 24 may be provided with holes 52 and 54 into which the screw 46 is secured. One or both of holes 52 and 54 may be threaded, or screw 46 may be a self-tapping locking screw. The screws 46 must make very tight locking engagement with the threads in the lower bracket 24. As the hole 54 is formed, by piercing or the like, a ridge 56 is formed around hole 54 to provide increased gripping engagement between the screw 46 and the part 24.

The bracket parts 22 and 24 may be formed of special high strength alloy steel which may be further heat treated and hardened after the parts are formed.

If desired, the chain may be looped around so that a link 62 near loop 40 may be held by shackle 18 of the padlock 12, along with the outer link such as the end link 64 of the chain. Such a configuration could provide added security to the assembly.

In closing, it is to be understood that the foregoing description and the drawings illustrate one preferred embodiment of the invention. Other configurations may be employed to accomplish the purposes described hereinabove. Thus, by way of example, but not of limitation, two spaced parts each having holes for sliding over the shackle of the padlock may be secured together by one, two, or more heavy rivets, either on only one side of one end of the chain link, or on both sides thereof. In a less preferred embodiment, requiring the cooperation of the padlock manufacturer, a single heavy sheet metal strip member may be formed in a "U" shaped configuration, with two spaced holes corresponding in function to holes 34 and 36, and mounted on the pivot shaft of the padlock prior to assembly with the main body of the padlock, with one end link of a chain having been previously linked onto the central portion of the single U-shaped member. However, the type of configuration as shown in the drawings, wherein the assembly may be later applied to the padlock is preferred, as special prior manufacturing arrangements are not required. Accordingly, the present invention is not limited to the specific embodiment as shown in the drawings and described hereinabove.

What is claimed is:

1. An assembly for securing a chain to a padlock and for precluding separation of the chain and padlock, comprising:

a pair of sheet metal brackets each being bent to provide a pair of upstanding ears and a pair outwardly extending arms, with the two outwardly extending arms overlying one-another;

said outwardly extending arms having opposite facing notches defining a means for receiving and securing a link of a chain in said notches;

means for rigidly securing and locking said two brackets together in the area where the arms overlap one-another to permanently secure the chain to said brackets; and said ears having aligned spaced hole means extending through said ears for receiving the pivot shank portion of the padlock, said holes in said brackets being of a relatively small diameter to closely fit around the pivot shank of a padlock and being fixedly spaced apart by said locking means by a sufficiently great distance to preclude removal over the bent portion of said shank;

whereby, when said brackets are first assembled with the pivot shank portion of said padlock and a link of said chain located in said notches, and the brackets are then locked together, a permanent assembly is formed with the chain secured to said padlock even when the padlock is unlocked.

2. An assembly as defined in claim 1 wherein said securing and locking means is a screw including one-way driving means on the head thereof, with said head being located between said two ears whereby removal of said screw is inhibited.

3. An assembly as defined in claim 1 wherein said hole means make a tight fit on said padlock pivot shank.

4. An assembly as defined in claim 1 wherein said bracket ears and bracket arms are oriented at right angles with respect to one-another.

5. An assembly as defined in claim 1 wherein said brackets are formed of high strength alloy steel.

6. An assembly as defined in claim 2 wherein said screw is in locking frictional engagement with at least one of said two brackets to hold said two brackets together.

7. A permanent padlock and chain assembly, comprising:

a conventional padlock having a shackle having a curved portion and a straight pivot shank;

a chain;

first and second heavy sheet metal members each having an apertured first portion mounted with the aperture closely fitting over said straight pivot shank, and having a second portion displaced in orientation relative to said first portion, with the second portion of both of said sheet metal members overlying one-another;

means for permanently and rigidly locking the overlapping portions of said first and second members together with said apertured first portions being fixedly spaced apart from one-another to prevent removal of said two members from said shackle even when said padlock is open; and means including opposite facing notches in said overlapping portions defining a means for locking onto one link of said chain when said two members are secured together.

8. An assembly as defined in claim 7 wherein said locking means is a screw including a one-way driving means on the head thereof.

* * * * *